United States Patent
Ma et al.

(10) Patent No.: US 11,157,180 B2
(45) Date of Patent: Oct. 26, 2021

(54) COMPUTING SYSTEMS INCLUDING STORAGE DEVICES CONTROLLED BY HOSTS

(71) Applicant: Samsung Electronics Co., Ltd., Suwon-si (KR)

(72) Inventors: Jin-Hee Ma, Seoul (KR); Sungkug Cho, Hwaseong-si (KR); Sang-Hoon Choi, Seoul (KR)

(73) Assignee: Samsung Electronics Co., Ltd.

(*) Notice: Subject to any disclaimer, the term of this patent is extended or adjusted under 35 U.S.C. 154(b) by 0 days.

(21) Appl. No.: 16/799,894

(22) Filed: Feb. 25, 2020

(65) Prior Publication Data

US 2020/0192584 A1 Jun. 18, 2020

Related U.S. Application Data (62) Division of application No. 15/605,968, filed on May 26, 2017, now Pat. No. 10,592,130.

(30) Foreign Application Priority Data

Sep. 28, 2016 (KR) .................. 10-2016-0124781

(51) Int. Cl.
*G06F 3/06* (2006.01)
*G06F 12/02* (2006.01)

(52) U.S. Cl.
CPC .......... *G06F 3/0619* (2013.01); *G06F 3/0655* (2013.01); *G06F 3/0659* (2013.01);
(Continued)

(58) Field of Classification Search
CPC .... G06F 3/0619; G06F 3/0655; G06F 3/0659; G06F 3/0688; G06F 12/0246
See application file for complete search history.

(56) References Cited

U.S. PATENT DOCUMENTS

| 8,015,347 B2 | 9/2011 | Kitsunai et al. |
| 8,055,832 B2 | 11/2011 | Sinclair et al. |

(Continued)

FOREIGN PATENT DOCUMENTS

| JP | 2010-205167 A | 9/2010 |
| KR | 20160007988 A | 1/2016 |

OTHER PUBLICATIONS

Apurva Vaidya, "NVMe Based PCIe SSD Validation Challenges and Solutions," Storage Developer Conference, 2013.
NVM Express 1.1 Intel 2013 (Year: 2012).

*Primary Examiner* — Ryan Bertram
(74) *Attorney, Agent, or Firm* — Myers Bigel, P.A.

(57) ABSTRACT

Disclosed is a computing system which includes a storage device and a host. The storage device may include a nonvolatile memory, and the host may control the storage device based on a physical address of the nonvolatile memory and may send an asynchronous event request command to the storage device. The storage device may monitor the nonvolatile memory and may send an asynchronous event request corresponding to the asynchronous event request command to the host based on the monitoring result. The asynchronous event request may include requesting another command from the host based on the monitoring result. In some aspects, the host may send an erase command for erasing to erase a selected memory block of the nonvolatile memory to the storage device. In response, the storage device may send an erase pass response or an erase delay violation response to the host in response to the erase command.

20 Claims, 9 Drawing Sheets

(52) U.S. Cl.
CPC ........ *G06F 3/0688* (2013.01); *G06F 12/0246* (2013.01); *G06F 2212/7201* (2013.01)

(56) References Cited

U.S. PATENT DOCUMENTS

| | | | |
|---|---|---|---|
| 8,161,226 B2 | 4/2012 | Illendula et al. | |
| 8,203,881 B2 | 6/2012 | Kim et al. | |
| 8,681,554 B2 | 3/2014 | Suzuki | |
| 9,201,789 B1 | 12/2015 | Kang et al. | |
| 9,229,854 B1 | 1/2016 | Kuzmin et al. | |
| 9,274,945 B2 | 3/2016 | Haas et al. | |
| 2010/0217917 A1* | 8/2010 | Bryant-Rich | G11C 7/24 711/103 |
| 2010/0235713 A1 | 9/2010 | Lee et al. | |
| 2013/0238831 A1* | 9/2013 | He | G06F 12/0246 711/103 |
| 2014/0115293 A1 | 4/2014 | Taylor | |
| 2015/0043277 A1* | 2/2015 | Fitzpatrick | G06F 3/064 365/185.11 |
| 2015/0143068 A1* | 5/2015 | Higgins | G06F 12/0238 711/166 |
| 2015/0161034 A1* | 6/2015 | Fisher | G06F 3/064 711/103 |
| 2015/0161036 A1* | 6/2015 | Camp | G06F 11/1012 711/103 |
| 2015/0356020 A1 | 12/2015 | Desai et al. | |
| 2016/0012918 A1 | 1/2016 | Mun et al. | |
| 2016/0098201 A1 | 4/2016 | Kim et al. | |
| 2016/0170871 A1* | 6/2016 | Hyun | G06F 3/0653 711/103 |
| 2016/0179412 A1* | 6/2016 | Camp | G06F 12/0261 711/103 |
| 2016/0188221 A1* | 6/2016 | Janik | G06F 3/0655 711/103 |
| 2016/0239206 A1* | 8/2016 | Yun | G06F 3/0688 |
| 2017/0262175 A1* | 9/2017 | Kanno | G06F 3/0679 |
| 2017/0262178 A1 | 9/2017 | Hashimoto | |
| 2017/0285969 A1* | 10/2017 | Madraswala | G11C 16/225 |
| 2018/0039578 A1 | 2/2018 | Yun et al. | |
| 2018/0074973 A1 | 3/2018 | Chan et al. | |
| 2018/0088841 A1* | 3/2018 | Ma | G06F 3/0688 |
| 2018/0225065 A1 | 8/2018 | Singh et al. | |
| 2018/0275894 A1* | 9/2018 | Yoshino | G06F 3/0616 |
| 2018/0293191 A1* | 10/2018 | Li | G06F 13/16 |
| 2019/0095110 A1* | 3/2019 | Watt | G06F 3/064 |

\* cited by examiner

COMPUTING SYSTEMS INCLUDING STORAGE DEVICES CONTROLLED BY HOSTS

CROSS-REFERENCE TO RELATED APPLICATIONS

The present application claims priority under 35 U.S.C. § 120 as a divisional of U.S. patent application Ser. No. 15/605,968, filed May 26, 2017, which in turn, claims priority under 35 U.S.C. § 119 is made to Korean Patent Application No. 10-2016-0124781 filed Sep. 28, 2016, in the Korean Intellectual Property Office, the entire contents of each of which are hereby incorporated by reference.

BACKGROUND

Aspects of the present disclosure herein relate to computing systems, and more particularly, to computing systems including storage devices controlled by hosts.

A solid state drive (SSD) is a typical example of a flash memory based data storage device. Interfaces that are used in data storage devices such as SSDs include serial advanced technology attachment (SATA), peripheral component interconnect express (PCI Express or PCIe), serial attached SCSI (SAS, where SCSI is itself an initialism representing Small Computer System Interface), and the like. The performance of SSD devices is being continuously improved, and the amount of data that may be simultaneously processed is gradually increasing. However, since conventional interfaces such as SATA are not specialized for data storage devices such as SSDs, conventional interface may have limitations. To overcome such limitations, non-volatile memory express (NVMe) is being developed thanks to an endeavor to make a standardized interface suitable for SSD devices. The NVMe interface specification includes a register-level interface that conveys information between the data storage device, such as a SSD, and host software. The NVMe is based on a conventional PCIe bus and is an interface optimized for the SSD.

The SSD includes a traditional SSD and an open-channel SSD. The traditional SSD may include a flash translation layer therein to receive a logical address-based instruction from a host. Since the open channel SSD might not include a flash translation layer in the SSD, the open channel SSD might not receive a logical address based instruction from a host. Instead, the host may include a flash translation layer and may directly manage physical addresses of the open-channel SSD in which data are stored.

SUMMARY

Aspects of the present disclosure provide a computing system including a storage device capable of requesting a reliability improvement operation from a host.

According to an aspect of the present disclosure, a computing system may include a storage device and a host. The storage device may include a nonvolatile memory, and the host may control the storage device based on a physical address of the nonvolatile memory. The host may send an asynchronous event request command to the storage device. The storage device may monitor the nonvolatile memory and may send an asynchronous event request command corresponding to the asynchronous event request command to the host based on the monitoring result. The asynchronous event request may include requesting another command from the host based on the monitoring result.

According to another aspect of the present disclosure, a computing system may include a storage device and a host. The storage device may include a nonvolatile memory. The host may control the storage device based on a physical address of the nonvolatile memory and may send an erase command for erasing a selected memory block of the nonvolatile memory to the storage device. The storage device may send an erase pass response or an erase delay violation response to the host in response to the erase command, and the storage device may send the erase delay violation response when receiving the erase command within an erase delay time from a previous erase point in time of the selected memory block.

According to another aspect of the present disclosure, a computing system may include a host, which may include a processor and a host memory. The computing system may also include a storage device, which may include a nonvolatile memory connected to the host via a storage interface. The host memory may store instructions that control the processor to perform operations. The operations may include transmitting an asynchronous event request command to the storage device; receiving, from the storage device, an asynchronous event request responsive to the asynchronous event request command; transmitting, to the storage device, a detailed information request command responsive to information included in the asynchronous event request; and receiving, from the storage device, a response to the detailed information request command.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Below, aspects of the present disclosure have been described in detail to convey to one of ordinary skill in the art the inventive concepts provided herein.

Figure 1:
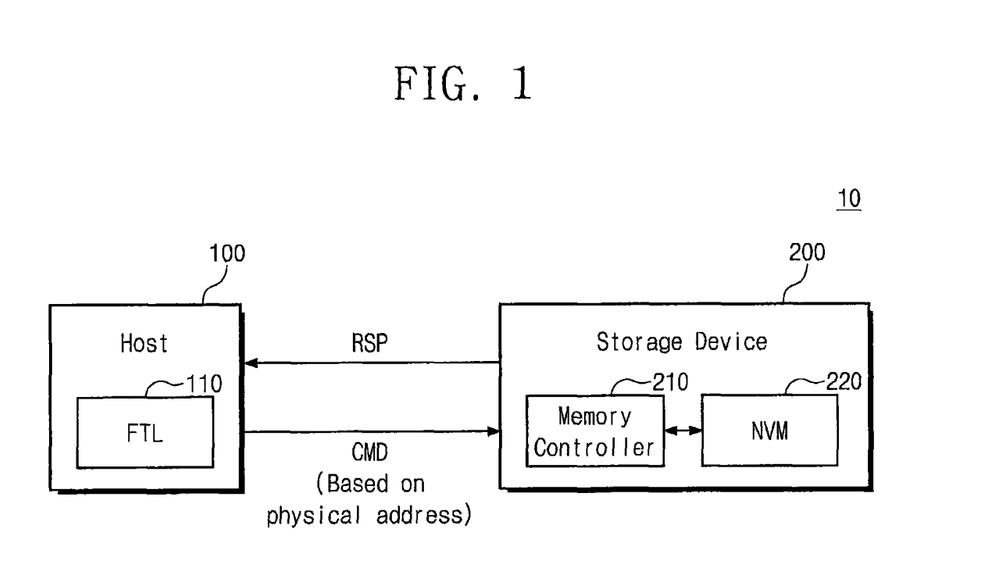
FIG. 1 is a block diagram illustrating a computing system including a storage device controlled by a host.

FIG. 1 is a block diagram illustrating a computing system including a storage device controlled by a host. Referring to FIG. 1, a computing system 10 may include a host 100 and a storage device 200. For example, the storage device 200 may operate as an open-channel SSD. Below, it is assumed that the storage device 200 is an open-channel SSD.

The host 100 may control overall operations of the storage device 200. For example, the host 100 may include a flash translation layer (FTL) 110. The flash translation layer 110 may map logical addresses used in the host 100 on, or onto or to, physical addresses of a nonvolatile memory 220 of the storage device 200. Accordingly, the host 100 may directly manage the physical addresses of the nonvolatile memory 220 through the flash translation layer 110.

The host 100 may send various commands CMD to the storage device 200. For example, the host 100 may send default commands CMD for read, write, and erase operations. The default commands CMD may be generated based on the physical addresses of the nonvolatile memory 220. Also, the host 100 may perform management operations of the storage device 200 such as data placement, input/output (I/O) scheduling, and a background operation. The management operations may be also performed based on the physical addresses of the nonvolatile memory 220.

The storage device 200 may include a memory controller 210 and the nonvolatile memory 220. For example, the memory controller 210 may receive the default commands CMD for read, write, and erase operations. On the basis of the received command CMD, the memory controller 210 may store data in the nonvolatile memory 220 or may read data stored in the nonvolatile memory 220. When an operation corresponding to the received command CMD is completed, the storage device 200 may send a response RSP corresponding to the received command to the host 100.

Also, the memory controller 210 may receive a command CMD associated with the reliability of data of the nonvolatile memory 220. For example, the memory controller 210 may perform a reclaim operation, an error correction operation, a garbage collection operation, a copy-back operation, or the like in response to the received command CMD. When an operation corresponding to the received command CMD is completed, the storage device 200 may send a response RSP corresponding to the received command to the host 100.

However, in the case of the open-channel SSD, since the host 100 manages the physical addresses of the nonvolatile memory 220, the storage device 200 may fail to change a location of data stored in the nonvolatile memory 220 by itself. Accordingly, if the reliability of data stored in the nonvolatile memory 220 is problematic, the storage device 200 may need to request a necessary command CMD from the host 100.

Figure 2:
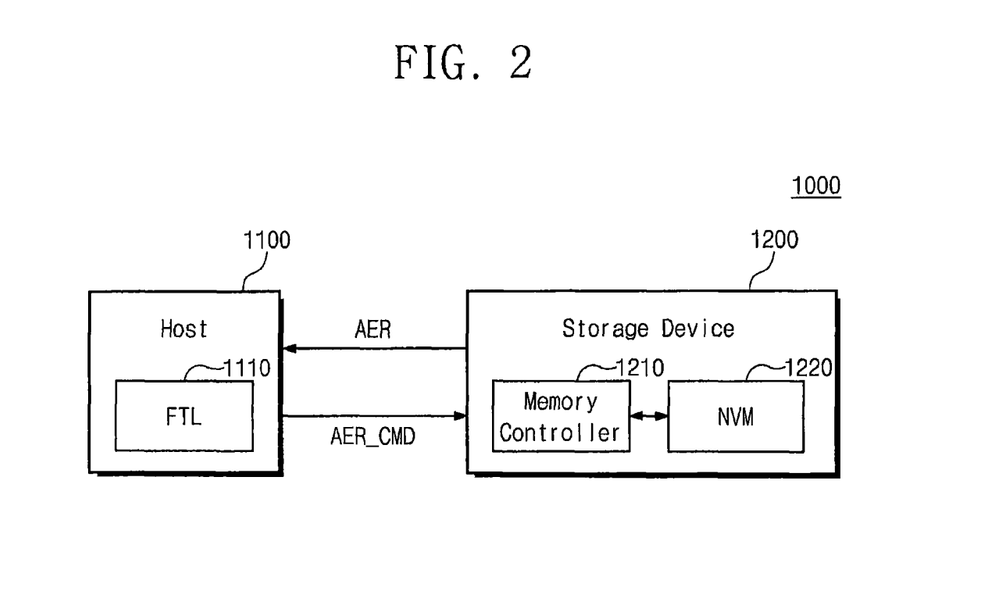
FIG. 2 is a block diagram illustrating a computing system including a storage device controlled by a host, according to aspects of the present disclosure.

FIG. 2 is a block diagram illustrating a computing system including a storage device controlled by a host, according to aspects of the present disclosure. Referring to FIG. 2, a computing system 1000 may include a host 1100 and a storage device 1200. For example, the storage device 1200 may operate as the open-channel SSD. Below, it is assumed that the storage device 1200 is an open-channel SSD.

The host 1100 may include a host processor (not shown) and a host memory (not shown). For example, the host processor may execute software (e.g., application programs, operating system (OS), device drivers) in the host 1100. The host processor may execute the operating system (OS) and the application programs loaded on the host memory. Under control of the host processor, program data to be sent to the storage device 1200 may be stored in the host memory, or data read from the storage device 1200 may be stored in the host memory. The host processor may include a plurality of host processors.

When the host memory is used as a working memory, application programs, a file system, device drivers, or the like may be loaded in the host memory. When the host memory is used as a temporary buffer for a transfer of data to the storage device 1200, data may be stored in the host memory. The host memory may be implemented with one or more host memories for each use. The host memory may include volatile memories such as a static random access memory (SRAM), a dynamic RAM (DRAM), and/or a synchronous DRAM (SDRAM), or nonvolatile memories such as a phase-change RAM (PRAM), a magnetic RAM (MRAM), a resistive RAM (RRAM), and/or a ferroelectric RAM (FRAM), or may be implemented with a combination thereof.

The host 1100 may communicate with the storage device 1200 based on a predetermined interfacing manner. For example, the predetermined interfacing manner may correspond to PCIe-based NVMe. However, the interfacing manner may not be limited to NVMe. In the case of the NVMe, the storage device 1200 may use an asynchronous event request AER that is defined in the NVMe specification. The storage device 1200 may make a necessary request of the host 1100 by using the asynchronous event request AER. However, where the interfacing manner does not correspond to the NVMe, the storage device 1200 may use a request means that may correspond to the asynchronous event request AER. Below, as an example, it is assumed that the storage device 1200 uses the asynchronous event request AER defined in the NVMe specification.

For example, the host 1100 may send an asynchronous event request command AER_CMD to the storage device 1200. The asynchronous event request command AER_CMD may be a command for receiving the asynchronous event request AER. That is, the asynchronous event request AER of the storage device 1200 may be a response to the asynchronous event request command AER_CMD. The host 1100 may perform another operation without waiting for a response to the asynchronous event request command AER_CMD. The storage device 1200 that receives the asynchronous event request command AER_CMD may monitor a nonvolatile memory 1220. When an issue is detected from the nonvolatile memory 1220 during monitoring, the storage device 1200 may send the asynchronous event request AER to the host 1100. The asynchronous event request AER may correspond to a previously received asynchronous event request command AER_CMD one to one.

The host 1100 that receives the asynchronous event request AER may send an information request command to the storage device 1200. That is, the host 1100 may request information about an issue part of the nonvolatile memory 1220, which corresponds to the monitoring result, from the storage device 1200. The storage device 1200 may send information of a memory block of the nonvolatile memory 1220, which may be a problematic memory block, to the host 1100 in response to the information request command.

The host 1100 may instruct the storage device 1200 to perform a reliability improvement operation based on the received information of the memory block of the nonvolatile memory 1220. For example, the host 1100 may perform a reclaim operation on an erroneous page of the nonvolatile memory 1220. The host 1100 may map data stored in the erroneous page on, or onto or to, another physical address and may instruct the storage device 1200 to move the data stored in the erroneous page.

The storage device 1200 may include a memory controller 1210 and the nonvolatile memory 1220. The memory controller 1210 may include a host interface and a memory interface, which may be a storage interface. The host interface may provide an interface between the host 1100 and the storage device 1200. An interfacing manner of the host interface may correspond to PCIe-based NVMe. However, the present disclosure is not limited thereto.

The storage interface (not shown) may provide a physical connection that allows the host 1100 and the storage device 1200 to interface with each other. The storage interface may send commands, addresses, data, etc., which are generated according to various requests, to the storage device 1200. This may include, for example, the AER and AER_CMD discussed above. An interfacing manner of the storage interface may correspond to PCIe-based NVMe. However, the storage interface is not limited to the NVMe.

The nonvolatile memory 1220 may include a nonvolatile memory such as a flash memory, a PRAM, an MRAM, an RRAM, or an FRAM or may be implemented with a combination thereof.

Figure 3:
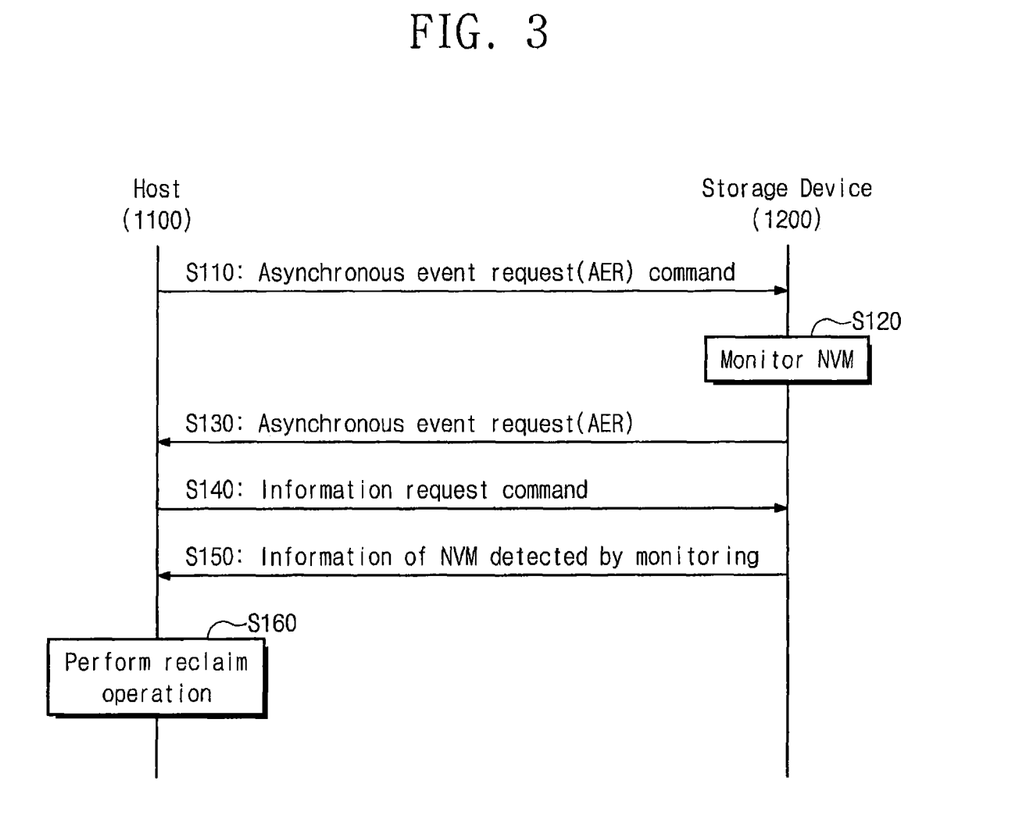
FIG. 3 is a flowchart illustrating a method of using an asynchronous event request, according to aspects of the present disclosure.

FIG. 3 is a flowchart illustrating a method of using an asynchronous event request, according to aspects of the present disclosure. Referring to FIG. 3, the storage device 1200 may request an operation needed for the nonvolatile memory 1220 from the host 1100 by using the asynchronous event request AER.

In operation S110, the host 1100 may send the asynchronous event request command AER_CMD to the storage device 1200. For example, to send the asynchronous event request AER to the host 1100 later, first, the storage device 1200 may need to receive the asynchronous event request command AER_CMD. The asynchronous event request command AER_CMD and the asynchronous event request AER may be paired. The host 1100 may perform another operation without waiting for a response to the asynchronous event request command AER_CMD.

In operation S120, the storage device 1200 that receives the asynchronous event request command AER_CMD may monitor the nonvolatile memory 1220. For example, the storage device 1200 may detect erroneous blocks and pages of the nonvolatile memory 1220. When an error is generated in a memory block or a page of the nonvolatile memory 1220, the storage device 1200 may generate the asynchronous event request AER.

In operation S130, the storage device 1200 sends the asynchronous event request AER to the host 1100 based on a monitoring result. For example, when an error is generated in a memory block or a page of the nonvolatile memory 1220, the storage device 1200 sends the asynchronous event request AER to the host 1100. The asynchronous event request AER is used to provide notification that an error is generated in the nonvolatile memory 1220 or to provide notification of a danger of occurrence of an error. However, the asynchronous event request AER may include only the fact of occurrence of an error and may not include specific information of the nonvolatile memory 1220. The asynchronous event request AER may be a response to the asynchronous event request command AER_CMD previously communicated to the storage device 1200 in operation S110.

In operation S140, the host 1100 may send an information request command to the storage device 1200 in response to the received asynchronous event request AER. For example, the host 1100 may request detailed information of a memory block or a page of the nonvolatile memory 1220 in which an error is generated.

In operation S150, the storage device 1200 may send the detailed information of the memory block or the page of the nonvolatile memory 1220, in which an error is generated, to the host 1100. For example, the storage device 1200 may provide the host 1100 with an address, the number of erroneous data bits, an erase count, or the like associated with an erroneous memory block or page.

In operation S160, the host 1100 may perform an action for an erroneous nonvolatile memory. For example, the host 1100 may perform the reclaim operation. The host 1100 may map erroneous data on, or onto or to, a new physical address of the nonvolatile memory 1220 and may send a reclaim command to the storage device 1200 to move the erroneous data.

As described above, according to aspects of the present disclosure, the storage device 1200 included in the computing system 1000 may send the asynchronous event request AER to the host 1100 at a required point in time. Accordingly, the storage device 1200 may request a necessary operation from the host 1100 through the asynchronous event request AER.

Figure 4:
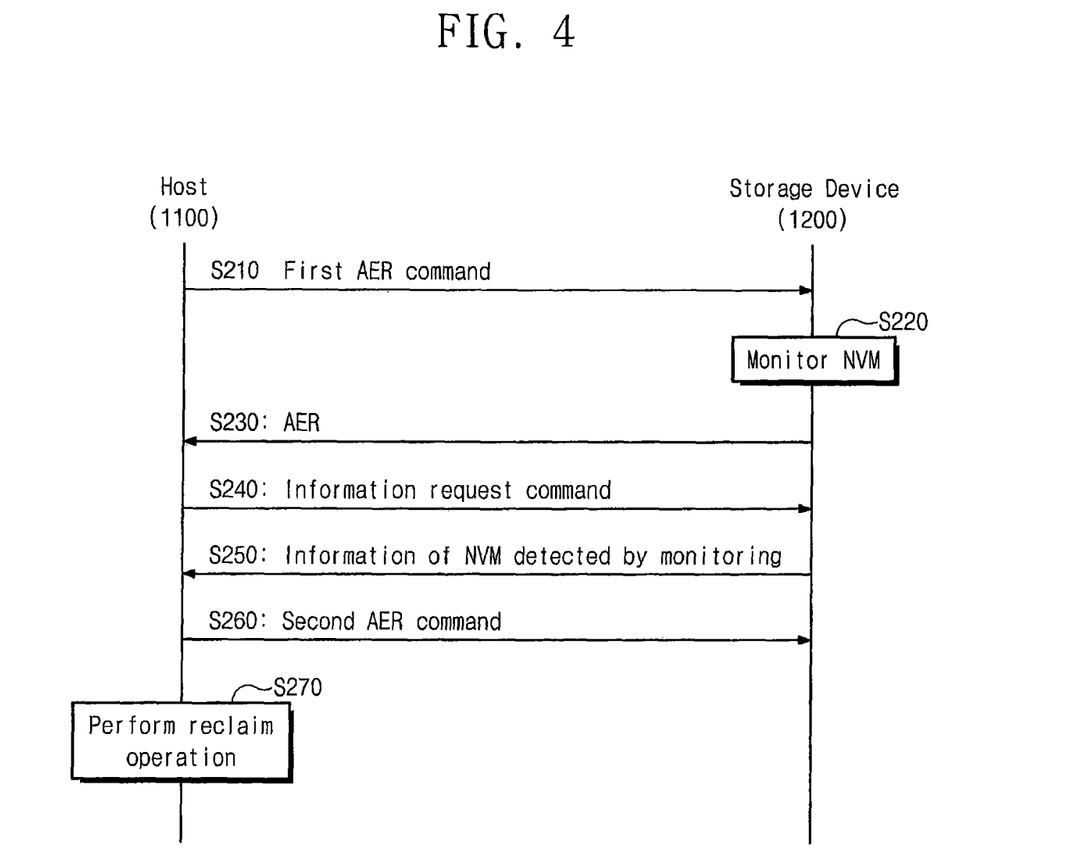
FIG. 4 is a flowchart illustrating a method of using an asynchronous event request, according to aspects of the present disclosure.

FIG. 4 is a flowchart illustrating a method of using an asynchronous event request, according to aspects of the present disclosure. Referring to FIG. 4, the storage device 1200 may request an operation needed for the nonvolatile memory 1220 from the host 1100 by using the asynchronous event request AER. The asynchronous event request command AER_CMD and the asynchronous event request AER may be paired. In FIG. 4, the host 1100 may receive the asynchronous event request AER as a response to a first asynchronous event request command AER_CMD and may then send a second asynchronous event request command AER_CMD again. Since the asynchronous event request AER corresponding to the first asynchronous event request command AER_CMD is already used, there may be a need to send a new second asynchronous event request command AER_CMD.

In operation S210, the host 1100 may send the first asynchronous event request command AER_CMD to the storage device 1200. The host 1100 may perform another operation without waiting for a response to the first asynchronous event request command AER_CMD.

In operation S220, the storage device 1200 that receives the first asynchronous event request command AER_CMD may monitor the nonvolatile memory 1220. For example, the storage device 1200 may detect erroneous blocks and pages of the nonvolatile memory 1220. When an error is generated in a memory block or a page of the nonvolatile memory 1220, the storage device 1200 may generate the asynchronous event request AER.

In operation S230, the storage device 1200 sends the asynchronous event request AER to the host 1100 based on a monitoring result. For example, the asynchronous event request AER may be used to provide notification that an error is generated in the nonvolatile memory 1220 or to provide notification of a danger of occurrence of an error. However, the asynchronous event request AER may include only the fact of occurrence of an error and may not include specific information of the nonvolatile memory 1220. Here, the transmitted asynchronous event request AER corresponds to the first asynchronous event request command AER_CMD communicated in operation S210.

In operation S240, the host 1100 may send the information request command to the storage device 1200 in response to the received asynchronous event request AER. For example, the host 1100 may request detailed information of a memory block or a page of the nonvolatile memory 1220 in which an error is generated.

In operation S250, the storage device 1200 may send the detailed information of the memory block or the page of the nonvolatile memory 1220, in which an error is generated, to the host 1100. For example, the storage device 1200 may provide the host 1100 with an address, the number of erroneous data bits, an erase count, or the like associated with an erroneous memory block or page.

In operation S260, the host 1100 may send the second asynchronous event request command AER_CMD to the storage device 1200. For example, the asynchronous event request command AER_CMD and the asynchronous event request AER may correspond to each other one-to-one. The host 1100 has already received the asynchronous event request AER as a response of the first asynchronous event request command AER_CMD in operation S230. Accordingly, for the storage device 1200 to send another asynchronous event request AER, the host 1100 needs to send the second asynchronous event request command AER_CMD.

In operation S270, the host 1100 may perform an action for an erroneous nonvolatile memory. For example, the host 1100 may perform the reclaim operation. The host 1100 may map erroneous data on a new physical address of the nonvolatile memory 1220 and may send a reclaim command to the storage device 1200 to move the erroneous data.

As described above, according to aspects of the present disclosure, the storage device 1200 included in the computing system 1000 may send the asynchronous event request AER to the host 1100 at a required point in time. Accordingly, the storage device 1200 may request a necessary operation from the host 1100 through the asynchronous event request AER. Also, after receiving the asynchronous event request AER corresponding to the first asynchronous event request command AER_CMD, the host 1100 may send the second asynchronous event request command AER_CMD to the storage device 1200. Accordingly, the storage device 1200 may continue to send a necessary request to the host 1100.

Figure 5:
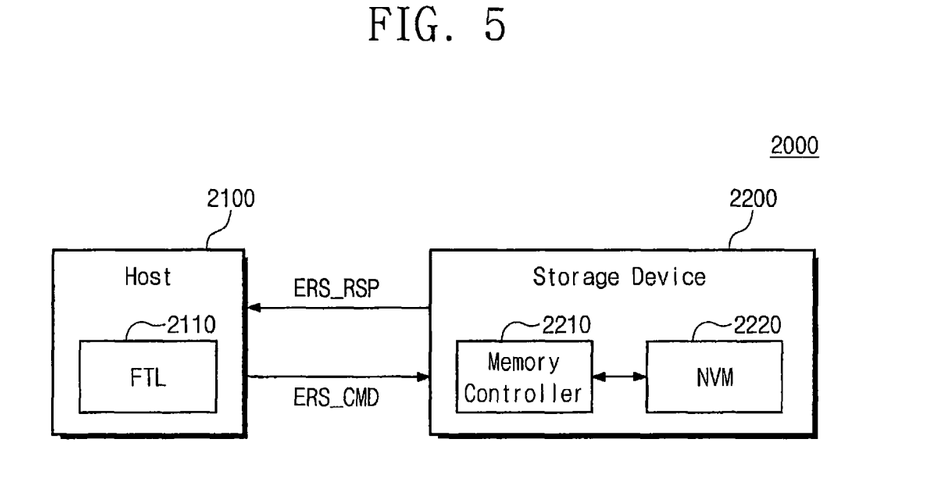
FIG. 5 is a block diagram illustrating a computing device including a storage system controlled by a host, according to aspects of the present disclosure.

FIG. 5 is a block diagram illustrating a computing system including a storage device controlled by a host, according to aspects of the present disclosure. Referring to FIG. 5, a computing system 2000 may include a host 2100 and a storage device 2200. For example, the storage device 2200 may operate as the open-channel SSD. Below, it is assumed that the storage device 2200 is the open-channel SSD. The nonvolatile memory 2220 of the storage device 2200 may need a predetermined time until the nonvolatile memory 2220 is erased due to various causes and is then erased again. The predetermined time may be referred to as a "mandatory erase delay time". The mandatory erase delay time may be applied in units of a memory block that is an erase unit of the nonvolatile memory 2220.

The host 2100 may communicate with the storage device 2200 based on a predetermined interfacing manner. For example, the predetermined interfacing manner may correspond to PCIe-based NVMe. However, the interfacing manner may not be limited to NVMe.

The host 2100 may include a host processor (not shown) and a host memory (not shown). For example, the host processor may execute software (e.g., application programs, operating system (OS), device drivers) in the host 2100. The host processor may execute the operating system (OS) and the application programs loaded on the host memory. Under control of the host processor, program data to be sent to the storage device 2200 may be stored in the host memory, or data read from the storage device 2200 may be stored in the host memory. The host processor may include a plurality of host processors.

When the host memory is used as a working memory, application programs, a file system, device drivers, or the like may be loaded in the host memory. When the host memory is used as a temporary buffer for a transfer of data to the storage device 2200, data may be stored in the host memory. The host memory may be implemented with one or more host memories for each use. The host memory may include volatile memories such as a static random access memory (SRAM), a dynamic RAM (DRAM), and/or a synchronous DRAM (SDRAM), or nonvolatile memories such as a phase-change RAM (PRAM), a magnetic RAM (MRAM), a resistive RAM (RRAM), and/or a ferroelectric RAM (FRAM), or may be implemented with a combination thereof.

The host 2100 may send an erase command ERS_CMD to the storage device 2200. For example, the host 2100 may search for to-be-erased memory blocks through a flash translation layer 2110. The host 2100 may select one memory block as an erase target based on the search result. The host 2100 may send the erase command ERS_CMD for erasing the selected memory block. The host 2100 may designate a physical address of the selected memory block to send the erase command ERS_CMD corresponding to the selected memory block.

Meanwhile, the storage device 2200 may determine whether a memory block corresponding to the received erase command ERS_CMD is erasable. For example, a memory controller 2210 may check a previous erase point in time of the selected memory block. Each memory block may have a mandatory erase delay. The memory controller 2210 may determine whether the erase command ERS_CMD satisfies a mandatory erase delay condition.

The storage device 2200 may include the memory controller 2210 and the nonvolatile memory 2220. The memory controller 2210 may include a host interface and a storage interface. The host interface may provide an interface between the host 2100 and the storage device 2200. An interfacing manner of the host interface may correspond to PCIe-based NVMe. However, the present disclosure may not be limited thereto.

The storage interface may provide a physical connection that allows the host 2100 and the storage device 2200 to interface with each other. The storage interface may send commands, addresses, data, or the like which are generated according to various requests, to the storage device 2200. An interfacing manner of the storage interface may correspond to PCIe-based NVMe. However, the storage interface is not limited to the NVMe.

The storage device 2200 may send an erase response ERS RSP to the erase command ERS_CMD. For example, when the erase command ERS_CMD is received within a mandatory erase delay time from the previous erase point in time, the memory controller 2210 may send an erase delay violation response to the host 2210. When the erase command ERS_CMD is received after the mandatory erase delay time from the previous erase point in time, the memory controller 2210 may send an erase pass response. In this case, the memory controller 2210 may perform an erase operation of the selected memory block.

The nonvolatile memory 2220 may include a nonvolatile memory such as a flash memory, a PRAM, an MRAM, an RRAM, or an FRAM or may be implemented with a combination thereof.

Figure 6:
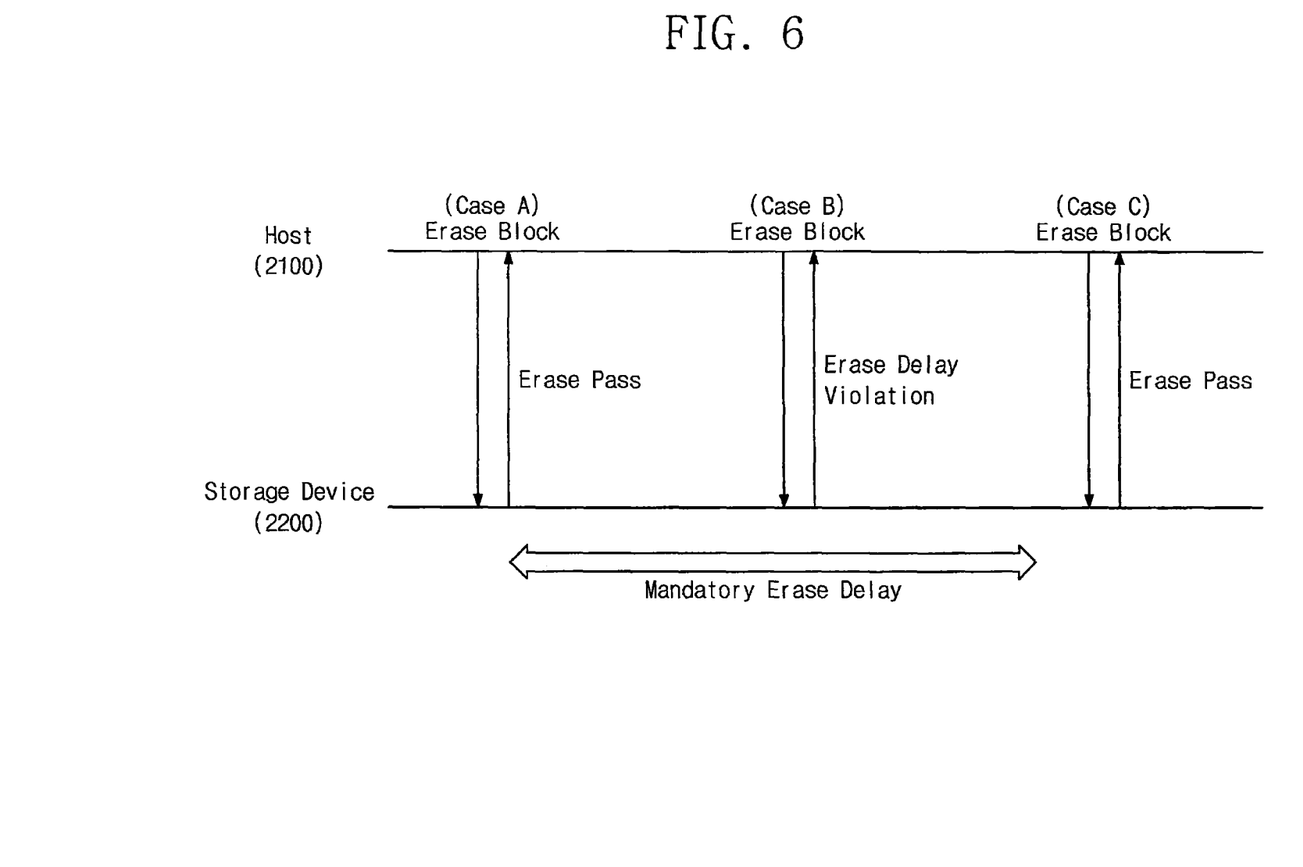
FIG. 6 is a drawing illustrating an erase pass response or an erase delay violation response, according to aspects of the present disclosure.

FIG. 6 is a drawing illustrating an erase pass response or an erase delay violation response, according to aspects of the present disclosure. Referring to FIG. 6, the storage device 2200 may send an erase pass response or an erase delay violation response to the erase command ERS_CMD from the host 2100.

The storage device 2200 may perform an erase operation on a specific memory block in response to a previous erase command of the specific memory block and may send the erase pass response to the host 2100 (Case A). A mandatory erase delay may be computed from this point in time. When the erase command ERS_CMD is received within a mandatory erase delay time from the previous erase point in time, the storage device 2200 may send an erase delay violation response to the host 2100 (Case B). When the erase command ERS_CMD is received after the mandatory erase delay time from the previous erase point in time, the storage device 2200 may send an erase pass response to the host 2100 (Case C). In this case, the storage device 2200 may perform the erase operation of the specific memory block again.

Figure 7:
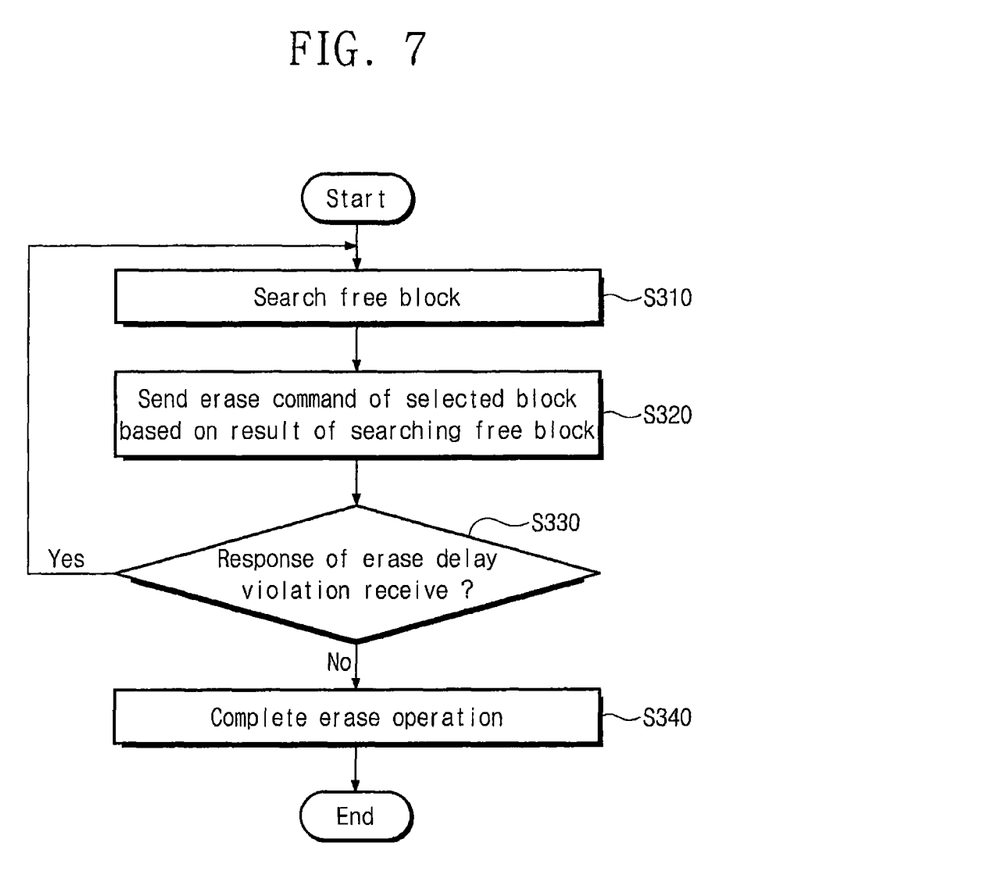
FIG. 7 is a flowchart illustrating an erase operation in a host, according to aspects of the present disclosure.

FIG. 7 is a flowchart illustrating an erase operation in a host, according to aspects of the present disclosure. Referring to FIG. 7, the host 2100 may select a memory block of the nonvolatile memory 2220 as an erase target. The host 2100 may send an erase command for erasing the selected memory block to the storage device 2200 and may receive a response to the erase command from the storage device 2200.

In operation S310, the host 2100 may search for a free block of the nonvolatile memory 2220. For example, the host 2100 may search for the free block through the flash translation layer 2110. The flash translation layer 2110 manages state information of memory blocks of the nonvolatile memory 2220. The flash translation layer 2110 may manage memory blocks to be erased by using a free block list. The host 2100 may select one memory block of the nonvolatile memory 2220 as an erase target based on the search result.

In operation S320, the host 2100 may send an erase command for erasing the selected memory block to the storage device 2200 based on the result of searching for the free block. For example, the host 2100 may designate a physical address of the selected memory block to send the erase command.

In operation S330, the host device 2100 may receive a response to the erase command from the storage device 2200. For example, the response to the erase command may include an erase pass response or an erase delay violation response. If the erase pass response is received from the storage device 2200, the process proceeds to operation S340. In operation S340, the host 2100 may terminate an erase operation on the selected memory block. Meanwhile, if the erase delay violation response is received from the storage device 2200, the process proceeds to operation S310. In this case, the host 2100 may again search for a free block through the flash translation layer 2110. Also, the host 2100 may select a memory block that is different from the previously selected memory block.

Figure 8:
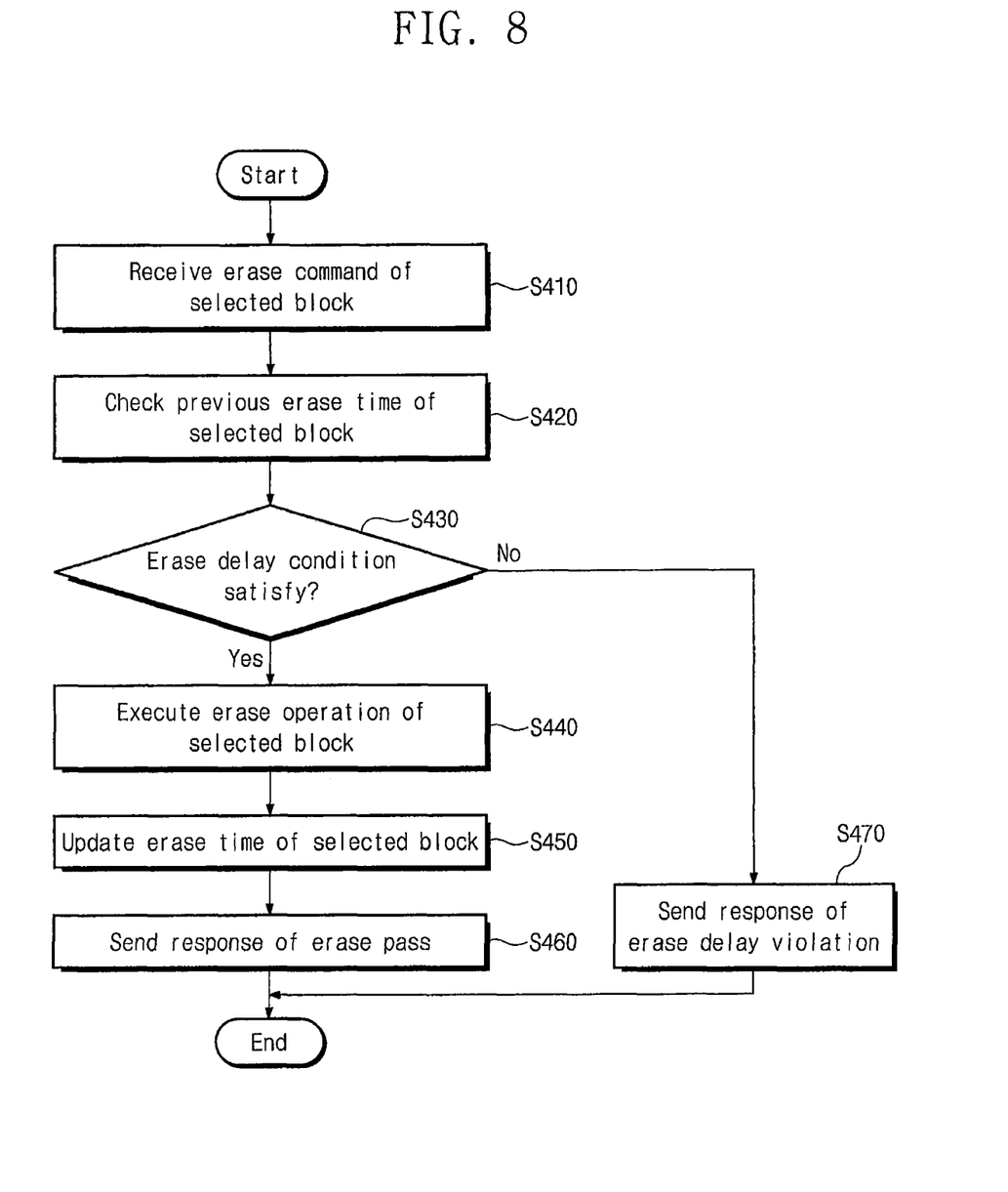
FIG. 8 is a flowchart illustrating an erase operation in a storage device, according to aspects of the present disclosure.

FIG. 8 is a flowchart illustrating an erase operation in a storage device, according to aspects of the present disclosure. Referring to FIG. 8, the storage device 2200 may send an erase pass response or an erase delay violation response to an erase command of the host 2100.

In operation S410, the storage device 2200 may receive the erase command indicating erasing of a selected memory block. For example, the storage device 2200 may receive an erase command, in which a physical address of the selected memory block is designated, from the host 2100.

In operation S420, the storage device 2200 may check a previous erase point in time of the selected memory block. For example, the memory controller 2210 may store an erase point in time for each of memory blocks of the nonvolatile memory 2220. The memory controller 2210 may use a previous erase point in time as a reference for determining whether a memory block is erasable.

In operation S430, the storage device 2200 may determine whether the selected memory block satisfies an erase delay condition. For example, when an erase command associated with the selected memory block is received within a mandatory erase delay time from a previous erase point in time of the selected memory block ("No" branch from operation S430), the process proceeds to operation S470, in which the storage device 2200 sends the erase delay violation response to the host 2100. Meanwhile when an erase command associated with the selected memory block is received after the mandatory erase delay time from the previous erase point in time of the selected memory block ("Yes" branch from operation S430), the process proceeds to operation S440.

In operation S440, the storage device 2200 may perform an erase operation on the selected memory block. In operation S450, the storage device 2200 may update an erase point in time of the selected memory block. For example, the erase point in time of the selected memory block is updated with the latest erase point in time, the mandatory erase delay time may be again computed on the basis of the updated erase point in time. In operation S460, the storage device 2200 may send an erase pass response to the host 2100 as the result of erasing the selected memory block.

Figure 9:
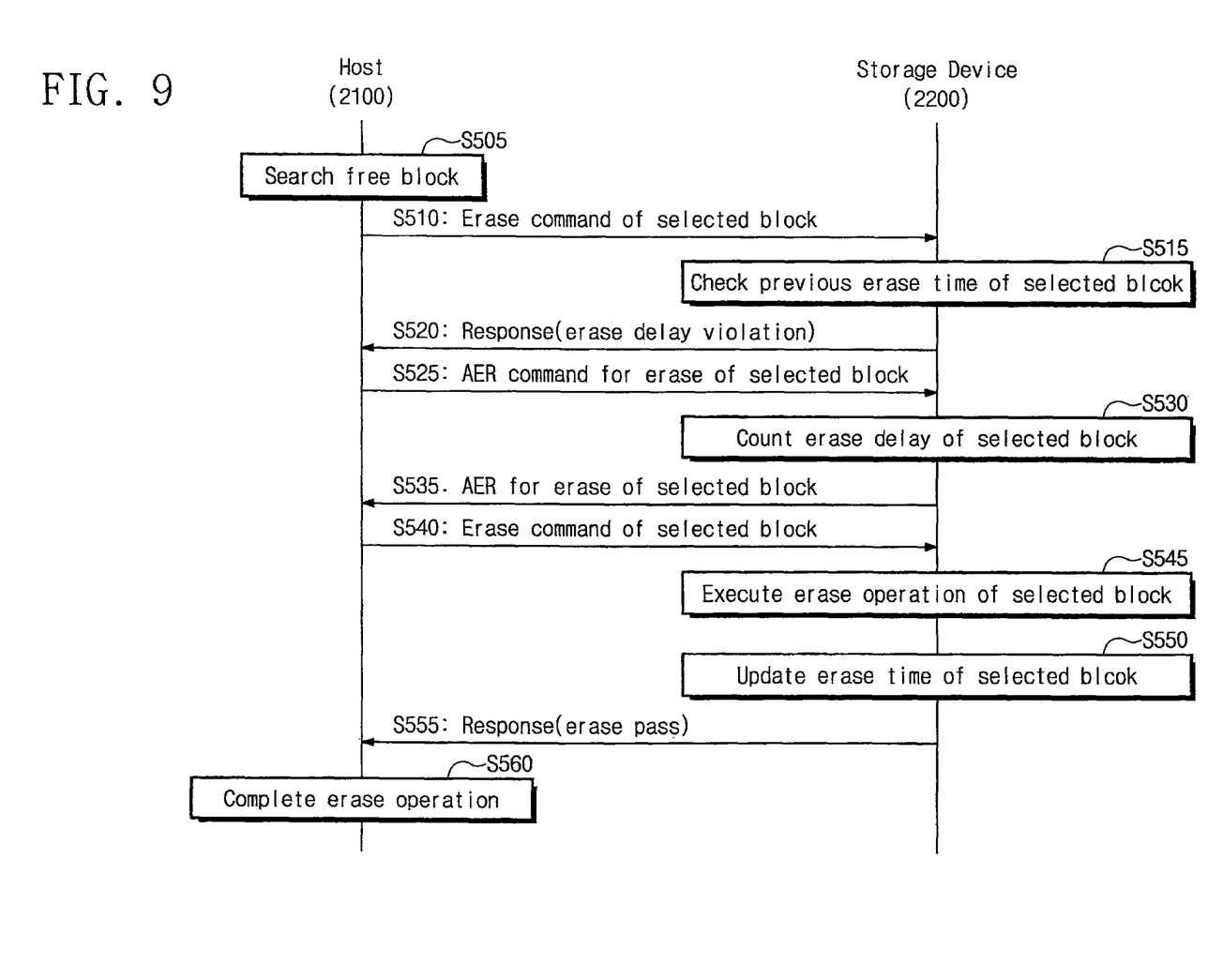
FIG. 9 is a flowchart illustrating an erase operation using an asynchronous event request, according to aspects of the present disclosure.

FIG. 9 is a flowchart illustrating an erase operation using an asynchronous event request, according to aspects of the present disclosure. Referring to FIG. 9, an erase operation of a selected memory block may be performed by using the asynchronous event request AER.

In operation S505, the host 2100 may search for a free block of the nonvolatile memory 2220. For example, the host 2100 may search for a free block through the flash translation layer 2110. The flash translation layer 2110 manages state information of memory blocks of the nonvolatile memory 2220. The host 2100 may select one memory block of the nonvolatile memory 2220 as an erase target based on the search result.

In operation S510, the host 2100 may send an erase command for erasing the selected memory block to the storage device 2200. For example, the erase command may include a physical address of the selected memory block. In operation S515, the storage device 2200 may check a previous erase point in time of the selected memory block. For example, the memory controller 2210 may store an erase point in time for each of memory blocks of the nonvolatile memory 2220. The memory controller 2210 may use a previous erase point in time as a reference for determining whether a memory block is erasable.

In operation S520, the storage device 2200 may send an erase delay violation response to the host 2100. This may mean that an erase command associated with the selected memory block is received within a mandatory erase delay time from a previous erase point in time of the selected memory block.

In operation S525, the host 2100 may send the asynchronous event request command AER_CMD for requesting an erase operation of the selected memory block to the storage device 2200. For example, the host 2100 may send the asynchronous event request command AER_CMD and may perform another operation.

In operation S530, the storage device 2200 may count a mandatory erase delay of the selected memory block. For example, the memory controller 2210 may compute the remaining time of the mandatory erase delay time of the selected memory block.

If the mandatory erase delay time of the selected memory block elapses, in operation S535, the storage device 2200 may send an asynchronous event request to the host 2100 with regard to the selected memory block. In operation S540, the host 2100 may again send an erase command for erasing the selected memory block.

In operation S545, the storage device 2200 may perform an erase operation on the selected memory block. In this case, the storage device 2200 may not check the mandatory erase delay of the selected memory block. The reason is that the memory controller 2210 knows that the selected memory block is erasable.

In operation S550, the storage device 2200 may update an erase point in time of the selected memory block. In operation S555, the storage device 2200 may send an erase pass response to the host 2100 as the result of erasing the selected memory block. In operation S560, the host 2100 may terminate an erase operation of the selected memory block.

According to aspects of the present disclosure, in the erase operation, the storage device 2200 actively inform the host 2100 whether the selected memory block is erasable, based on the asynchronous event request. Also, the host 2100 may reduce a time needed to search for a free block, and the storage device 2200 may reduce a time needed to determine whether the selected memory block is erasable.

Figure 10:
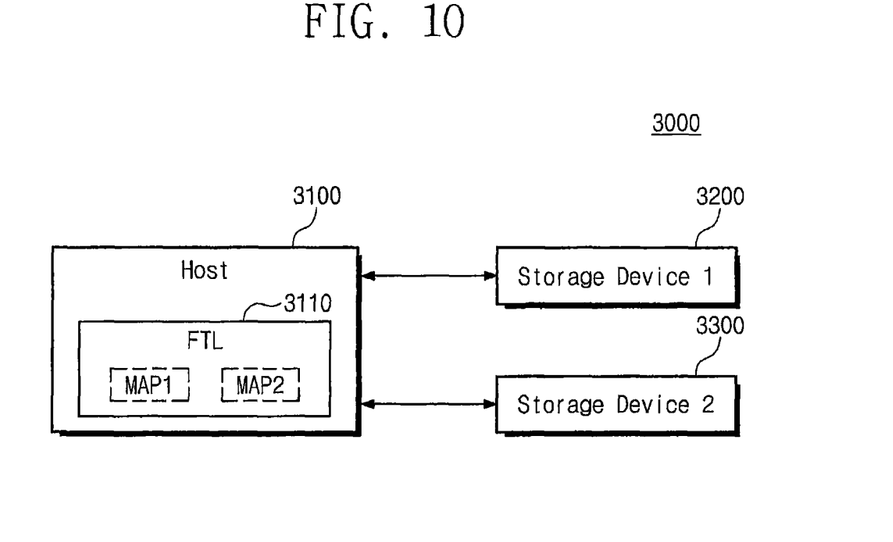
FIG. 10 is a block diagram illustrating a computing system including a storage device controlled by a host, according to aspects of the present disclosure.

FIG. 10 is a block diagram illustrating a computing system including a storage device controlled by a host, according to aspects of the present disclosure. Referring to FIG. 10, a computing system 3000 may include first and second storage devices 3200 and 3300. At least one of the first storage device 3200 or the second storage device 3300 may include a memory controller and a nonvolatile memory illustrated in FIG. 2 or 5.

The host 3100 may individually manage mapping tables MAP1 and MAP2 of the first and second storage devices 3200 and 3300. The host 3100 may issue a command based on physical addresses of the first and second storage devices 3200 and 3300. The host 3100 may issue an asynchronous event request command to each of the first and second storage devices 3200 and 3300. When the host 3100 receives an asynchronous event request from any one of the first and second storage devices 3200 and 3300, the host 3100 may allow data to be moved between the first and second storage devices 3200 and 3300. For example, the host 3100 may allow data to be moved to the second storage device 3300 through the reclaim operation of the first storage device 3200. Also, the host 3100 may allow data to shift to the first storage device 3200 through the reclaim operation of the second storage device 3300.

The host 3100 may perform management operations of the first and second storage devices 3200 and 3300 such as data placement, input/output (I/O) scheduling, and a background operation. For example, the host 3100 may perform the management operations based on physical addresses of the first and second storage devices 3200 and 3300. Also, the host 3100 may combine the first and second storage devices 3200 and 3300 to perform the management operations. Accordingly, the host 3100 may efficiently manage the first and second storage devices 3200 and 3300.

According to aspects of the present disclosure, a storage device may make a request of a host, and the host may perform an operation of improving the reliability in response to the request of the storage device.

While the inventive concepts have been described with reference to exemplary embodiments, it will be apparent to those skilled in the art that various changes and modifications may be made without departing from the scope of the inventive concepts. Therefore, it should be understood that the above embodiments are not limiting, but illustrative.

What is claimed is:

1. A storage device comprising:
a nonvolatile memory; and
a controller configured to receive a first command from an external device, to send a delay violation response to the external device, to receive an asynchronous event request command for requesting an operation, to send an asynchronous event request to the external device, and to receive again the first command from the external device,
wherein the controller is configured to perform the operation after the controller receives again the first command from the external device.

2. The storage device of claim 1, wherein the first command is a read command, a write command, an erase command, a reclaim command, a garbage collection command, or a copy-back command.

3. The storage device of claim 1, wherein the asynchronous event request indicates a potential or an actual occurrence of an error.

4. The storage device of claim 1, wherein the storage device is configured to communicate with the external device using a PCIe-based NVMe interface.

5. The storage device of claim 1, wherein the controller is configured to receive the asynchronous event request command for requesting an erase operation on a specific memory block of the nonvolatile memory.

6. The storage device of claim 1, wherein the controller is configured to send a pass response to the external device.

7. The storage device of claim 1, wherein the controller is configured to send response information indicating an address, a number of erroneous data bits, and/or an erase count of a potential error.

8. A storage device comprising:
a nonvolatile memory; and
a controller configured to receive from an external device an asynchronous event request command for requesting an operation, to monitor the nonvolatile memory, to send an asynchronous event request based on a monitoring result to the external device, and to receive an information request command requesting information about at least a portion of the nonvolatile memory having an error corresponding to the asynchronous event request,
wherein the controller is configured to perform the operation based on a first command received from the external device.

9. The storage device of claim 8, wherein the first command is associated with a reliability of the nonvolatile memory to perform a reclaim operation, an error correction operation, a garbage collection operation, or a copy-back operation.

10. The storage device of claim 8, wherein the asynchronous event request indicates a potential or an actual occurrence of the error.

11. The storage device of claim 8, wherein the controller is configured to send a delay violation response to the external device.

12. The storage device of claim 8, wherein the controller is configured to receive the asynchronous event request command for requesting an erase operation.

13. The storage device of claim 8, wherein the controller is configured to send a pass response to the external device.

14. The storage device of claim 8, wherein the controller is configured to send a response information indicating an address, a number of erroneous data bits, and/or an erase count of a potential error.

15. A storage device comprising:
a nonvolatile memory; and
a controller configured to receive from an external device a first asynchronous event request command for requesting an operation, to monitor the nonvolatile memory, to send a first asynchronous event request based on a first monitoring result to the external device, to receive a second asynchronous event request command, to send a second asynchronous event request based on a second monitoring result, and to receive an information request command requesting information corresponding to the second asynchronous event request,
wherein the controller is configured to perform the operation based on a first command received from the external device.

16. The storage device of claim 15, wherein the first command is a read command, a write command, an erase command, a reclaim command, a garbage collection command, or a copy-back command.

17. The storage device of claim 15, wherein the controller is configured to receive the second asynchronous event request command after sending the first monitoring result.

18. The storage device of claim 15, wherein the information request command includes requesting information about at least a portion of the nonvolatile memory having an error.

19. The storage device of claim 15, wherein the controller is configured to send response information indicating an address, a number of erroneous data bits, and/or an erase count of a potential error.

20. The storage device of claim 15, wherein the first asynchronous event request indicates a potential or an actual occurrence of an error.

* * * * *